US012264540B2

(12) United States Patent
Cocilova

(10) Patent No.: US 12,264,540 B2
(45) Date of Patent: Apr. 1, 2025

(54) TOILET TRAINING STEP LADDER

(71) Applicant: Michael Cocilova, Orlando, FL (US)

(72) Inventor: Michael Cocilova, Orlando, FL (US)

( * ) Notice: Subject to any disclaimer, the term of this patent is extended or adjusted under 35 U.S.C. 154(b) by 0 days.

(21) Appl. No.: 18/487,556

(22) Filed: Oct. 16, 2023

(65) Prior Publication Data

US 2024/0041274 A1 Feb. 8, 2024

Related U.S. Application Data

(63) Continuation of application No. PCT/US2022/024839, filed on Apr. 14, 2022.

(60) Provisional application No. 63/174,795, filed on Apr. 14, 2021.

(51) Int. Cl.

| | |
|---|---|
| ***E06C 1/20*** | (2006.01) |
| ***A47K 17/02*** | (2006.01) |
| ***E06C 1/387*** | (2006.01) |
| ***E06C 7/18*** | (2006.01) |

(52) U.S. Cl.

CPC ................ *E06C 1/20* (2013.01); *A47K 17/02* (2013.01); *E06C 1/387* (2013.01); *E06C 7/182* (2013.01)

(58) Field of Classification Search

CPC ........ A47K 17/02; A47K 17/028; E06C 1/20; E06C 1/387; E06C 7/182; E06C 7/18

USPC .......................................................... 182/156

See application file for complete search history.

(56) References Cited

U.S. PATENT DOCUMENTS

| | | | | | |
|---|---|---|---|---|---|
| 1,439,419 | A | * | 12/1922 | Jacobs | E06C 1/393 182/228.1 |
| 1,737,163 | A | | 11/1929 | Keppinger | |
| 1,755,680 | A | * | 4/1930 | Wuest | A47C 12/02 182/33.2 |
| 1,778,898 | A | * | 10/1930 | Konigsberg | E06C 1/20 182/124 |
| 2,607,926 | A | | 8/1952 | De Puy | |
| 2,743,861 | A | * | 5/1956 | Mattis | E06C 9/08 182/95 |
| 2,798,652 | A | * | 7/1957 | Easton | E06C 7/183 182/15 |
| 2,873,056 | A | | 2/1959 | Gratton | |
| 2,952,301 | A | * | 9/1960 | Schlaak | E06C 1/387 D6/350 |

(Continued)

FOREIGN PATENT DOCUMENTS

| | | |
|---|---|---|
| CN | 203506565 | 4/2014 |
| CN | 210697459 | 6/2020 |

(Continued)

OTHER PUBLICATIONS

"Babyloo Bambino Booster 3-in-1-Collapsible Toilet Training Step Stool for Toddlers" Retrieved on Apr. 14, 2022, https://www.amazon.comeabyloo-Bambino-Booster-Collapsible-Cornertible/dp/B07DP946K7 (8 pages).

(Continued)

*Primary Examiner* — Daniel P Cahn
*Assistant Examiner* — Shiref M Mekhaeil
(74) *Attorney, Agent, or Firm* — Woods Oviatt Gilman LLP; Katherine H. McGuire, Esq.

(57) ABSTRACT

A toilet-training step stool or ladder that may be positioned around a toilet allowing a child to climb up and use a standard toilet seat. The ladder is especially useful for assisting a small male child to position and steady themselves adjacent to and facing the front of the toilet bowl while in a standing position.

3 Claims, 1 Drawing Sheet

(56) References Cited

U.S. PATENT DOCUMENTS

| | | | | | |
|---|---|---|---|---|---|
| 4,258,827 | A * | 3/1981 | Klose | E06C 1/393 | 297/130 |
| 4,276,955 | A * | 7/1981 | Hickman | E06C 1/005 | 269/244 |
| 4,290,502 | A * | 9/1981 | Anderson | A47C 12/02 | 182/125 |
| 4,295,544 | A * | 10/1981 | Peterson | E06C 7/182 | 182/104 |
| 4,534,072 | A | 8/1985 | Lipski | | |
| 5,443,136 | A * | 8/1995 | Ott, III | E06C 1/397 | 182/172 |
| 5,722,507 | A * | 3/1998 | Kain | E06C 1/393 | 182/104 |
| 6,000,497 | A * | 12/1999 | Kain | E06C 7/14 | 248/238 |
| 6,012,548 | A * | 1/2000 | Kim | E06C 1/393 | 182/161 |
| 6,026,933 | A * | 2/2000 | King | E06C 1/393 | 182/161 |
| 6,039,147 | A * | 3/2000 | Gillis | E06C 1/397 | 182/15 |
| D444,574 | S * | 7/2001 | Gibson | D25/65 | |
| 6,390,237 | B1 * | 5/2002 | Kim | E06C 1/387 | 182/161 |
| 6,443,261 | B1 * | 9/2002 | Gibson | E06C 7/14 | 182/104 |
| 6,536,557 | B2 * | 3/2003 | Gibson | E06C 1/393 | 182/161 |
| 6,550,579 | B2 * | 4/2003 | Gibson | E06C 1/387 | 182/161 |
| 6,902,035 | B2 * | 6/2005 | Baumgartner | E06C 1/393 | 182/165 |
| 7,128,187 | B2 * | 10/2006 | Simpson | E06C 7/14 | 182/129 |
| D565,745 | S * | 4/2008 | Meyers | D25/65 | |
| 8,002,084 | B2 * | 8/2011 | Huang | E06C 7/46 | 182/180.1 |
| 8,341,806 | B2 * | 1/2013 | Parker | A47C 12/00 | 16/349 |
| 8,997,931 | B2 * | 4/2015 | Parker | E06C 1/387 | 182/180.1 |
| 9,109,396 | B2 * | 8/2015 | William | E04G 1/24 | |
| 9,869,125 | B2 * | 1/2018 | Simpson | E06C 1/393 | |
| 10,034,555 | B1 * | 7/2018 | Van den Akker | A47C 4/02 | |
| 10,077,601 | B2 * | 9/2018 | Leng | E06C 1/393 | |
| D838,386 | S * | 1/2019 | Woodward | D25/64 | |
| 10,221,624 | B2 * | 3/2019 | Leng | E06C 1/20 | |
| 10,648,234 | B2 * | 5/2020 | Skubic | E06C 1/393 | |
| D889,689 | S * | 7/2020 | Russell | D25/64 | |
| 10,806,311 | B2 | 10/2020 | Lattig | | |
| 10,844,660 | B2 * | 11/2020 | Leng | E06C 1/387 | |
| 10,995,548 | B2 * | 5/2021 | Cornthwaite | E06C 1/16 | |
| 11,149,493 | B2 * | 10/2021 | Boyer | E06C 7/182 | |
| 11,655,676 | B2 * | 5/2023 | Foley | E06C 7/14 | 248/238 |
| 2005/0029050 | A1 * | 2/2005 | Baumgartner | E06C 1/393 | 182/165 |
| 2006/0272895 | A1 * | 12/2006 | Lavoie | B60R 3/02 | 182/127 |
| 2007/0144831 | A1 * | 6/2007 | Cole | A47C 12/02 | 182/33 |
| 2008/0217103 | A1 * | 9/2008 | Pucek | E06C 1/39 | 182/15 |
| 2010/0170750 | A1 * | 7/2010 | Leng | E06C 7/083 | 182/228.2 |
| 2011/0024234 | A1 * | 2/2011 | Lin | E06C 1/387 | 182/161 |
| 2011/0209946 | A1 * | 9/2011 | Leng | E06C 1/393 | 182/129 |
| 2014/0190769 | A1 * | 7/2014 | Parker | E06C 1/393 | 182/159 |
| 2017/0226803 | A1 * | 8/2017 | Russell | E06C 7/185 | |
| 2018/0094484 | A1 * | 4/2018 | Frame | E06C 1/20 | |
| 2019/0128065 | A1 * | 5/2019 | Christianson | E06C 7/183 | |
| 2019/0328187 | A1 | 10/2019 | Lattig | | |
| 2023/0313612 | A1 * | 10/2023 | Major | E06C 7/14 | 182/13 |

FOREIGN PATENT DOCUMENTS

| | | |
|---|---|---|
| CN | 111839322 | 10/2020 |
| CN | 211933855 | 11/2020 |
| EP | 2090740 | 8/2009 |
| FR | 2904759 | 2/2008 |
| JP | 2005-087695 | 4/2005 |
| KR | 101884131 | 7/2018 |

OTHER PUBLICATIONS

"Children's Potty Step Stool Plain wood or with Stain" Retrieved on Apr. 14, 2022, https://www.pinterest.com/pin/753719687617333021/ (2 pages).

"Mum's clever Kmart hack for toilet training" Mum's Grapevine, dated Oct. 1, 2019, Retrieved on Apr. 14, 2022, https://mumsgrapevine.com.au/2019/10/kmart-step-hack-toilet-training/ (11 pages).

"Potty Training Seat Ladder—Step Stool" Retrieved on Apr. 14, 2022, https://www.amazon.com/Potty-Training-Seat-Ladder-Toddlers/dp/B08NHV4G3Q/ (7 pages).

"Potty Training Seat with Adjustable Ladder" Retrieved on Apr. 14, 2022 https://www.amazon.com/dp/B0827N7H9G/ (8 pages).

* cited by examiner

TOILET TRAINING STEP LADDER

CROSS-REFERENCE TO RELATED APPLICATIONS

This application is a continuation of PCT Application No. PCT/US2022/024839 filed Apr. 14, 2022, which claims the benefit of U.S. Provisional Application No. 63/174,795 filed Apr. 14, 2021, the contents of which are incorporated herein by reference.

BACKGROUND OF THE INVENTION

The present invention relates to a child toilet training ladder for assisting a child to use a standard toilet.

SUMMARY OF THE INVENTION

The present invention provides a toilet-training step stool or ladder that may be positioned around a toilet which allows a child to climb up and use a standard toilet seat. The ladder is especially useful for assisting a small male child to position and steady themselves adjacent to and facing the front of the toilet bowl while in a standing position.

The ladder includes a frame for positioning adjacent a toilet with steps attached to the frame allowing a small child to climb the ladder and be at the correct elevation for using the toilet.

The frame includes a generally U-shaped frame member having first and second legs with free ends for placing on a floor and an upper horizontally extending frame segment extending between the first and second legs opposite the free ends thereof.

First and second elongated frame members pivotally attach to the first and second legs, respectively, of the U-shaped frame member at a location between the upper frame segment and the free ends of the first and second legs.

The ladder includes one or more steps which may fixedly or pivotally attach to and extend between the first and second elongated frame members, respectively.

The first and second frame members may be moved about their respective pivot connection to the U-shaped frame member allowing the ladder to be moved between a folded, storage condition and an unfolded, in-use condition. When in the storage condition, the first and second elongated frame members locate adjacent to the first and second legs of the U-shaped member, respectively, and the one or more steps pivot toward a vertical position. When in the in-use position, the first and second elongated legs extend at an angle relative to the first and second legs of the U-shaped member, respectively, thereby allowing the ladder to freely stand on a floor.

When moved to the in-use, unfolded condition, the first and second of legs of the U-shaped frame are positioned on either side of the toilet bowl and the horizontally extending middle extent of the U-shaped frame is positioned directly above the toilet bowl. A male child may therefore use the middle extent of the U-shaped frame as a handle to hold onto while urinating into the toilet bowl.

Additional objects, advantages and novel aspects of the present invention will be set forth in part in the description which follows, and will in part become apparent to those in the practice of the invention, when considered with the attached figures.

DESCRIPTION OF THE DRAWING FIGURES

The above-mentioned and other features and advantages of this invention, and the manner of attaining them, will become apparent and be better understood by reference to the following description of the invention in conjunction with the accompanying drawing, wherein.

DETAILED DESCRIPTION OF A PREFERRED EMBODIMENT

Figure 2:
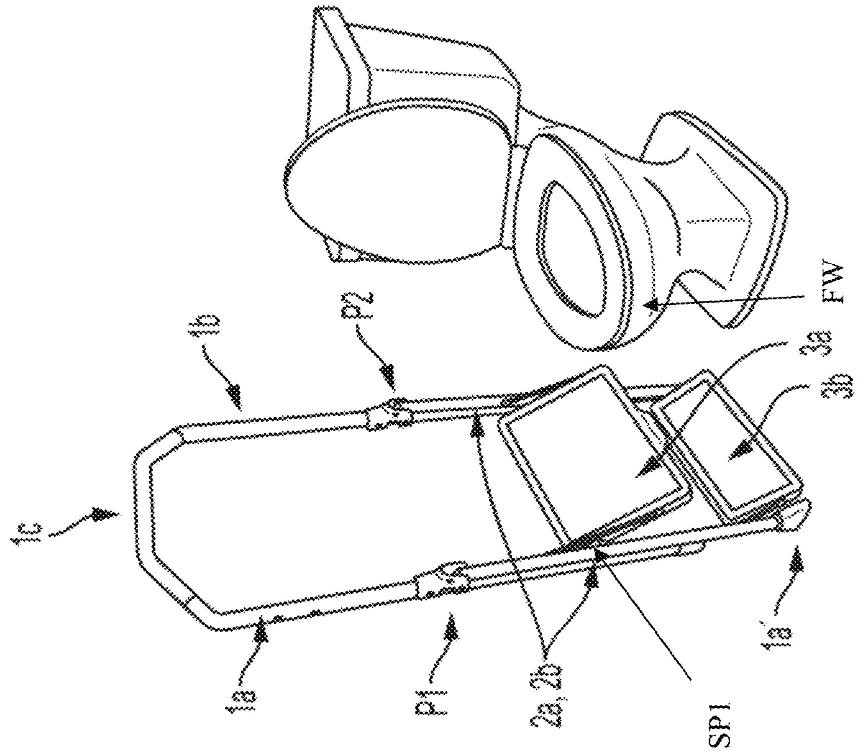
FIG. 2 is a perspective view of the ladder of FIG. 1 showing the ladder folded into a storage position.
Figure 1:
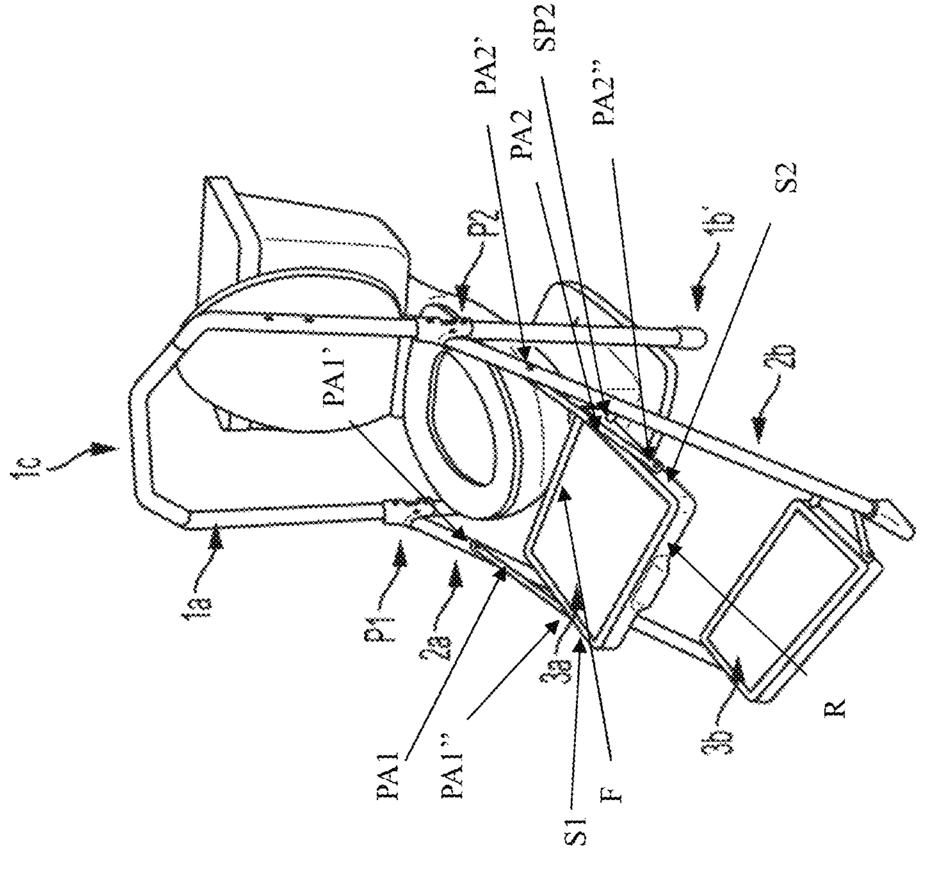
FIG. 1 is a perspective view of a toilet training ladder according to an embodiment of the invention with the ladder in the unfolded, in-use condition next to a toilet.

Referring to FIG. 1, there is seen an embodiment of the present invention comprising provides a toilet-training step stool or ladder that may be positioned around a toilet which allows a child to climb up and use a standard toilet seat. The ladder is especially useful for assisting a small male child to position and steady themselves adjacent to and facing the front of the toilet bowl while in a standing position.

The ladder includes a frame for positioning adjacent a toilet with steps attached to the frame allowing a small child to climb the ladder and be at the correct elevation for using the toilet.

The frame includes a generally U-shaped frame member 1 having first and second legs 1*a* and 1*b* with free ends 1*a*' and 1*b*' for placing on a floor and an upper horizontally extending frame segment 1*c* extending between the first and second legs 1*a* and 1*b* opposite the free ends 1*a*' and 1*b*' thereof, respectively.

First and second elongated frame members 2*a* and 2*b* pivotally attach via pivot connectors P1 and P2 to the first and second legs 1*a* and 1*b*, respectively, of the U-shaped frame member at a location between the upper frame segment 1*c* and the free ends 1*a*' and 1*b*' of the first and second legs 1*a* and 1*b*, respectively.

The ladder includes one or more steps 3*a* and 3*b* each having a front edge "F" a rear edge "R" and opposite side edges "S1" and "S2" which may fixedly or pivotally attach, at pivot points SP1 and SP2 adjacent step front edge F, to and extend between the first and second elongated frame members 2*a* and 2*b*, respectively. First and second pivot arms PA1 and PA2 include opposite ends PA1', PA1" and PA2', PA2", respectively, which pivotally attach to opposite elongated arms 2*a*, 2*b* at ends PA1' PA2', respectively, and pivotally attach at opposite pivot arm ends PA1", PA2" to step side edges S1, S2, respectively, adjacent step rear edge R thereof. When the ladder is in use, the front edge F of the upper-most step 3*a* lies adjacent the front wall FW of the toilet bowl.

The first and second elongated frame members may be moved about their respective pivot connectors P1 and P2 to the U-shaped frame member allowing the ladder to be moved between a folded, storage condition and an unfolded, in-use condition. When in the storage condition, the first and second elongated frame members locate adjacent to the first and second legs of the U-shaped member, respectively, and the one or more steps pivot toward a vertical position. When in the in-use position, the first and second elongated legs extend at an angle relative to the first and second legs of the U-shaped member, respectively, thereby allowing the ladder to freely stand on a floor.

When moved to the in-use, unfolded condition, the first and second of legs of the U-shaped frame are positioned on either side of the toilet bowl and the horizontally extending middle extent of the U-shaped frame is positioned directly above the toilet bowl. A male child may therefore use the middle extent of the U-shaped frame as a handle to hold onto while urinating into the toilet bowl.

While the apparatus, methods and systems have been shown and described with reference to certain preferred embodiments thereof, it will be understood by those skilled in the art that various changes in form and details may be made therein without departing from the spirit and scope of the claims which follow.

What is claimed is:

1. A toilet training step ladder adapted to be positioned around a toilet having a toilet bowl, the ladder comprising:

a) a U-shaped frame member having first and second legs with respective free ends for placing on a floor and an upper horizontally extending frame segment extending between the first and second legs opposite the free ends thereof;

b) first and second elongated frame members pivotally attached to the first and second legs, respectively, of the U-shaped frame member at a location between the upper horizontally extending frame segment and the free ends of the first and second legs; and c) one or more steps each having opposite front and rear edges and opposite first and second side edges, each of said one or more steps pivotally attached at the opposite side edges thereof, at a location adjacent the front edge of a respective step, and extending between the first and second elongated frame members, respectively, said front edge of said one or more steps each facing a vertical plane defined by said upper horizontally extending frame segment, said first leg and said second leg, said upper horizontally extending frame segment configured to be positioned directly above the toilet bowl to provide a handle for manual grasping by a user located on a selected one of said one or more steps; and d) first and second elongated pivot arms each having opposite first and second ends with each pivot arm first end pivotally attached to one of the first and second elongated frame members, and each pivot arm second end pivotally attached to a respective one of the first and second opposite side edges of the respective step adjacent the rear edge of the respective step.

2. The toilet training step ladder according to claim 1 wherein said step ladder is configured to be moved between a folded, storage condition wherein said first and second elongated frame members are located adjacent said first and second legs of said U-shaped frame member, and an unfolded, in-use condition wherein said first and second elongated frame members extend at an angle relative to said first and second legs of said U-shaped frame member and thereby allowing said step ladder to stand on the floor with said one or more steps extending substantially horizontally.

3. A foldable toilet training step ladder adapted to be positioned around a toilet bowl having a front wall when the step ladder is in an unfolded condition, the ladder comprising:

a) a U-shaped frame member having first and second legs with respective free ends for placing on a floor and an upper horizontally extending frame segment extending between the first and second legs opposite the free ends thereof wherein the U-shaped frame member lies along a first vertical plane relative to the floor, said first vertical plane defined by said upper horizontally extending frame segment, said first leg and said second leg has been inserted after;

b) a first elongated frame member having a first end pivotally attached to the first leg of the U-shaped frame member at a location between the upper horizontally extending frame segment and the free end of the first leg, and a second end for placing on the floor;

c) a second elongated frame member having a first end pivotally attached to the second leg of the U-shaped frame member at a location between the upper horizontally extending frame segment and the free end of the second leg, and a second end for placing on the floor; and d) at least one step attached to and extending between the first and second elongated frame members, respectively, said at least one step having a first side edge, a second side edge, a rear edge, and a forward edge facing said first vertical plane; and e) first and second elongated pivot arms each having opposite first and second ends with each pivot arm first end pivotally attached to one of the first and second elongated frame members, and, each pivot arm second end pivotally attached to one of the first and second opposite side edges of the at least one step adjacent the rear edge thereof, wherein when the step ladder is in the unfolded condition the forward edge of said at least one step lies along a second vertical plane, wherein the second vertical plane is parallel to and spaced apart from the first vertical plane with the second vertical plane located between the U-shaped elongated frame member and each of the second ends of the first and second elongated frame members.

* * * * *